US 8,738,907 B2

(12) United States Patent
French (10) Patent No.: US 8,738,907 B2
(45) Date of Patent: May 27, 2014

(54) WIRELESS DEVICE AUTHENTICATION AND SECURITY KEY MANAGEMENT

(75) Inventor: Michael T. French, Lake In The Hills, IL (US)

(73) Assignee: Motorola Solutiions, Inc., Schaumburg, IL (US)

( * ) Notice: Subject to any disclaimer, the term of this patent is extended or adjusted under 35 U.S.C. 154(b) by 939 days.

(21) Appl. No.: 11/833,043

(22) Filed: Aug. 2, 2007

(65) Prior Publication Data

US 2009/0034736 A1     Feb. 5, 2009

(51) Int. Cl.
*G06F 21/00*     (2013.01)

(52) U.S. Cl.
USPC ............................................. 713/168; 726/29

(58) Field of Classification Search
CPC ....... H04L 63/08; H04L 9/3271; H04L 63/10; H04L 63/0435; G06F 2221/2129; G06F 2221/2103; H04W 12/06; G06Q 20/3278; G06K 19/07758
See application file for complete search history.

(56) References Cited

U.S. PATENT DOCUMENTS

| | | | |
|---|---|---|---|
| 6,480,096 B1 | 11/2002 | Gutman et al. | |
| 6,842,106 B2 * | 1/2005 | Hughes et al. | 340/5.8 |
| 6,925,560 B1 * | 8/2005 | Basquin | 713/169 |
| 7,688,976 B2 * | 3/2010 | Singhal | 380/46 |
| 7,987,455 B1 * | 7/2011 | Senner et al. | 717/136 |
| 2004/0240671 A1 * | 12/2004 | Hu et al. | 380/277 |
| 2004/0268132 A1 | 12/2004 | Waris | |
| 2006/0215026 A1 * | 9/2006 | Kamata et al. | 348/143 |
| 2007/0071238 A1 * | 3/2007 | Adams et al. | 380/46 |
| 2007/0186105 A1 * | 8/2007 | Bailey et al. | 713/168 |

FOREIGN PATENT DOCUMENTS

WO     WO9925066 A     10/1999

OTHER PUBLICATIONS

PCT Search Report Dated Oct. 24, 2008.
European Office Action for counterpart Application No. EP08 782 035 mailed on Jul. 1, 2011.
International Preliminary Report on Patentability for International Application No. PCT/US2008/070424 mailed on Feb. 11, 2010.
EPC Communication Dated Jul. 2, 2013 for Counterpart Application 08782035.3-1505.

\* cited by examiner

*Primary Examiner* — Michael S McNally
*Assistant Examiner* — Carlton Johnson
(74) *Attorney, Agent, or Firm* — Daniel R. Bestor; Anthony P. Curtis; Lalita W. Pace (57) ABSTRACT

A method and wireless device for updating at least one cryptographic security key (116) associated with a wireless device (104) and an authentication module (108). An over-the-air programming message comprising security key update information is received (804) from an information processing system (118). The security key update information is processed (808). At least one new security key is extracted from the security key update information in response to the processing (806). At least one existing security key (116) is updated with the at least one new security key (124) that has been extracted.

20 Claims, 8 Drawing Sheets

WIRELESS DEVICE AUTHENTICATION AND SECURITY KEY MANAGEMENT

FIELD OF THE INVENTION

The present invention generally relates to the field of wireless communications, and more particularly relates to managing authentication and security keys for wireless devices.

BACKGROUND OF THE INVENTION

The security of wireless device transmissions (and the device itself) has become an increased concern over the recent years. Therefore, various security functions are currently implemented within wireless devices. For example, wireless devices can utilize various encryption/decryption methods to encrypt/decrypt wireless transmission and/or locally stored data. One method utilizes keys, which can comprise a password(s), a table(s), a code(s), or the like which is used by the wireless device to perform encryption/decryption of data. In many settings such as in a business, a group of wireless devices share one or more common keys.

If a secure wireless device is compromised, e.g., stolen, all traffic transmitted on any keys included within the stolen device is also compromised. For example, if a key has a long cryptographic period such as six months, voice and data transmitted for the past six months has been compromised. A user may not determine that his/her wireless device has been compromised for many hours, days, or even weeks depending on the circumstances. The secure data stored within the device and/or being received at the device and all other devices using the same key is vulnerable until the device is either deactivated or the keys are erased.

However, deactivating the device does not guarantee that secure data stored within the device will become inaccessible. Deactivating the device in most instances only prevents the device from transmitting and receiving data. Data within the device is still accessible. With current security protocol implementations erasing/changing the keys can be very time consuming. Key management systems that are available today are also problematic because long crypto periods are required in order for the management system to run efficiently. If a device that is associated with a long crypto period, e.g., 1 day, 1 week, 1 month, or the like, is compromised, data and incoming transmissions are vulnerable until the key is erased or changed.

With current systems, when a user determines that his/her wireless device has been stolen, a security administrator is notified. The security administrator inhibits the particular wireless device and re-keys all other devices in the stolen wireless device group. Depending on the size of the wireless device group, the re-keying process can take many days, leaving information on the stolen device accessible by the adverse party.

Therefore a need exists to overcome the problems with the prior art as discussed above.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

Briefly, in accordance with the present invention, disclosed are a method and wireless device for updating a cryptographic security key associated with a wireless device and an authentication module. In a first embodiment, the method includes receiving an over-the-air programming message having security key update information from an information processing system. The security key update information is processed. A new security key is extracted from the security key update information in response to the processing. An existing security key is updated with the new security key that has been extracted.

In another embodiment, a method for updating cryptographic security keys associated with a wireless device and an authentication module is disclosed. The method includes determining that a security key associated with a wireless device and an authentication module is required to be updated. A new security key associated with the wireless device and authentication module is selected. The new security key is encapsulated in a secure update message. An over-the-air-message comprising the secure update message is transmitted to the wireless device.

In yet another embodiment of the invention, a wireless device for updating a cryptographic security key associated with a wireless device and an authentication module is disclosed. The wireless device includes a memory and a processor that is communicatively coupled to the memory. The wireless device also includes a security key updating module that is communicatively coupled to the memory and the processor. The security key updating module is adapted to receive an over-the-air programming message comprising security key update information from an information processing system. The security key update information is processed. A new security key is extracted from the security key update information in response to the processing. An existing security key is updated with the new security key that has been extracted.

The foregoing embodiments of the present invention provide a more efficient manner of updating security keys. Additionally, security keys residing at both a wireless device and authentication module can be managed by a remote key management system. The key management system can update keys residing at a wireless device via over-the-air programming messages. The key management system can also use the wireless device as a gateway for communicating security key update information to an authentication module.

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term wireless device is intended to broadly cover many different types of devices that can wirelessly receive signals, and optionally can wirelessly transmit signals, and may also operate in a wireless communication system. For example, and not for any limitation, a wireless device can include any one or a combination of the following: a cellular telephone, a mobile phone, a smartphone, a two-way radio, a two-way pager, a wireless messaging device, a laptop/computer, automotive gateway, residential gateway, and the like.

Wireless Communication System

Figure 1:
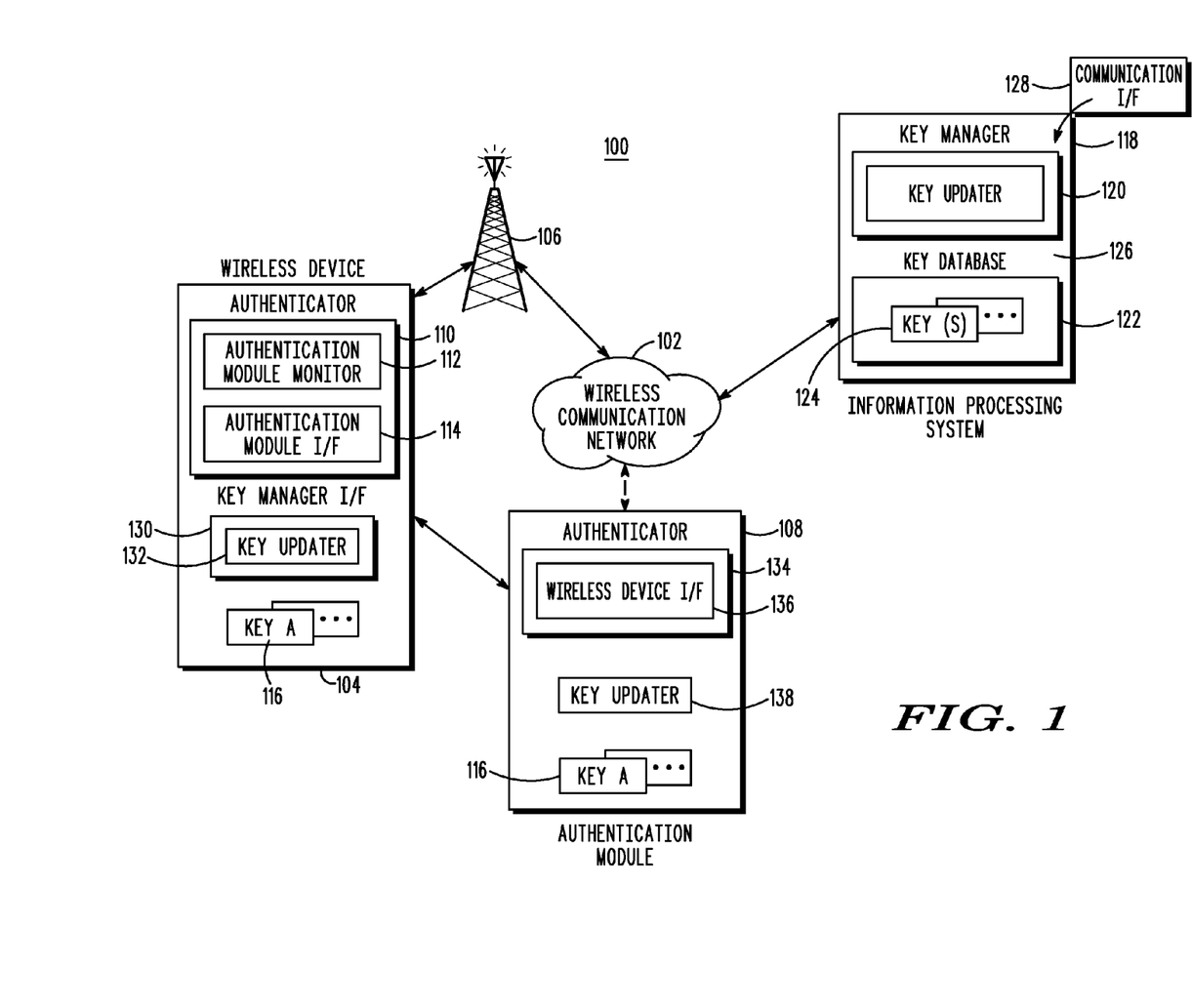
FIG. 1 is block diagram illustrating a wireless communication system, according to an embodiment of the present invention.

According to an embodiment of the present invention as shown in FIG. 1 a wireless communication system 100 is illustrated. FIG. 1 shows a wireless communication network 102 communicatively coupled to one or more wireless devices 104 (only one shown). In one embodiment, the wireless device 104 is also communicatively coupled to one or more base stations 106. The wireless communication network 102 can comprise one or more circuit service networks (not shown) and/or packet data networks (not shown). The packet data network can be an Internet Protocol (IP) or Session Initiated Protocol (SIP) based connectivity network, which provides data connections at much higher transfer rates than a traditional circuit services network. The packet data network can comprise an Evolution Data Only ("EV-DO") network, a General Packet Radio Service ("GPRS") network, a Universal Mobile Telecommunications System ("UMTS") network, an 802.11 network, an 802.16 (WiMax) network, Ethernet connectivity, dial-up modem connectivity, or the like. A circuit services network provides, among other things, voice services to the wireless device 104.

The communications standard of the wireless communication network 102 can comprise Code Division Multiple Access (CDMA), Time Division Multiple Access (TDMA), Global System for Mobile Communications (GSM), General Packet Radio Service (GPRS), Frequency Division Multiple Access (FDMA), IEEE 802.16 family of standards, Orthogonal Frequency Division Multiplexing (OFDM), Orthogonal Frequency Division Multiple Access (OFDMA), Wireless LAN (WLAN), WiMax or the like. Other applicable communications standards include those used for Public Safety Communication Networks including TErrestrial TRunked Radio (TETRA). Access networks within the wireless communication network can be owned and operated by separate wireless service providers or by the same wireless service provider.

The wireless communication system 100 supports any number of wireless devices 104 which can be single mode or multi-mode devices. Multi-mode devices are capable of communicating over multiple access networks with varying technologies. For example, a multi-mode device can communicate over various access networks using various services such as Push-To-Talk ("PTT"), Push-To-Talk Over Cellular ("PoC"), multimedia messaging, web browsing, VoIP, multimedia streaming, and the like.

The wireless communication system 100, in one embodiment, provides secure services to its subscribers. For example, a wireless service operator can allow businesses and individuals to transmit and receive encrypted transmissions. The wireless devices 104 are also configured to encrypt/decrypt stored data. Businesses and/or individuals may also want to implement authentication mechanisms for authenticating a wireless device user and/or a wireless device 104.

In one embodiment, a wireless device 104 is communicatively coupled to an authentication module 108. The authentication module 108 can be a Radio Frequency Identification ("RFID") tag, an infrared module, a Bluetooth module, a Zigbee module, or any other short-range transmission technology. The wireless device 104 communicates with the authentication module 108 before attempting to perform one or more functions in an identified set of functions that require authentication. Examples of these functions are transmitting data, receiving data, and the like. Functions can be either secure or non-secure. A secure function can comprise transmitting/receiving encrypted data (e.g., voice, text, multi-media, and the like), displaying sensitive data to a user, encrypting data, and the like. In another embodiment, the wireless device 104 communicates with the authentication module 104 anytime a function is to be performed on the wireless device. Stated differently, in order for the wireless device 104 to function it needs to authenticate itself with the authentication module 108.

In one embodiment, the wireless device 104 comprises an authenticator 110 that, among other things, determines the authentication status of the wireless device 104. The authenticator 110 can also determine an authentication status of one or more authentication modules 108 (only one shown). That is, a wireless device 104 can be associated with one or more authentication modules. Each authentication module 108 can be associated with the wireless device 104 for controlling access to certain functions in the wireless device 104.

In one scenario, a first authentication module 108 and a second authentication module 108 are both associated with the wireless device 104 for controlling access to the same set of functions in the wireless device 104. The first authentication module 108 can be used, for example, in a work environment, while the second authentication module 108 can be used at home. This is only one example, and it should be obvious in view of the present discussion that there are many possible alternative associations of authentication modules 108 and wireless devices 104.

In another scenario, a first authentication module 108 and a second authentication module 108 are both associated with the wireless device 104 for controlling access to respective first and second sets of functions in the wireless device 104. The first authentication module 108 is associated with the wireless device 104 for controlling access to the first set of functions in the wireless device. The second authentication module 108 is associated with the wireless device 104 for controlling access to the second set of functions in the wireless device. This second example illustrates the variety of different associations that are possible between authentication modules 108 and wireless devices 104.

In one embodiment, a wireless device 104 is associated with one authentication module 108. If the wireless device 104 detects the authentication module 108, the authenticator 110 determines whether the wireless device 104 is associated with that authentication module 108. If the authenticator 110 determines that the wireless device 104 is not associated with the authentication module 108, the wireless device 104 prevents access to certain functions that require authentication in the wireless device 104.

In one embodiment, the authentication module 108 also comprises an authenticator 134 for performing authentication requests received from a wireless device 104. The authentication module 108 communicates with the wireless device 104 via a wireless device interface 136. According to one example, in response to the authentication requests, the authenticator 134 performs an authentication process to determine association of the wireless device 104 with the authentication module 108. The authentication module 108 communicates its determined authentication status to the wireless device 104. The wireless device 104 is assisted by these communications of authentication status to determine whether the wireless device 104 is associated with the particular authentication module 108.

Additionally, in a further example, the wireless device 104 can perform its own authentication process, in combination with the received authentication status from the authentication module 108. In this alternative example, a two-way authentication process can be performed by both devices communicating with, and authenticating, each other.

The authentication module 108 can be located anywhere the wireless device 104 and authentication module 108 are able to communicate. For example, a user can keep the authentication module 108 on his/her person. In this example, the authentication module can be built into a piece of jewelry, configured to fit into a pocket or be wearable, and the like. This is advantageous because if the wireless device 104 is stolen, all functions or designated functions of the wireless device 104 are deactivated once the authenticator 110 determines that it can no longer detect the authentication module. Therefore, the authentication module 108 can act as a proximity authentication module, wherein all functions or a subset of functions of the wireless device 104 are operational only when the wireless device 104 is within a given proximity of the authentication module 108.

In one embodiment, the wireless device 104 detects an authentication module 108 via an authentication module monitor 112 and uses one or more authentication module interfaces 114 to communicate with the module 108. The authentication module interface 114 can utilize any short-range communication technology that allows the wireless device 104 to transmit and receive data to/from the authentication module 108. A wireless device 104 can be associated with a plurality of authentication modules at work, home and the like.

The authenticator 110 determines that a wireless device 104 is associated with a particular authentication module 108 via a cryptographic key(s) 116 shared between the wireless device 104 and the authentication module 108. For example, the wireless device 104 and its associated authentication modules 108 can each be preprogrammed with shared keys 116 or updated with shared keys. A shared key 116 is defined, in one embodiment, as a key existing at one or more wireless devices 104 and at one or more authentication modules 108. Although the term "key" is used throughout this discussion, the present invention is also applicable to derivatives of keys such as a Proximity Authentication Session Key, authentication materials such as a Random Seed, a Random Challenge, and the like. The Proximity Authentication Session Key, Random Seed, and a Random Challenge are discussed in greater detail below.

When the authentication module monitor 112 detects an authentication module 108, the authenticator 110 communicates with the authentication module 108 to determine if the wireless device 104 is associated with the module 108. Based on the message received back from the authentication module 108, the authenticator 110 determines if wireless device 104 is associated with the module 108 and authenticated for use or whether the module 108 is not associated with the wireless device 104. In one embodiment, if the wireless device 104 detects an authentication module 108 and is not associated with it, the wireless device 104 is determined to not be authenticated. If the wireless device 104 detects an authentication module 108 that it is associated with, i.e. the keys 116 exist at both devices or a challenge/response session is successful, it is determined to be authenticated. However, in another embodiment, although the keys 116 match, additional data besides the keys 116 is required to also match for the wireless device 104 to be authenticated. The authentication process is discussed in greater detail below.

As discussed above, functions such as powering on the device with a password, transmitting/receiving/displaying encrypted data, and the like can be performed by the user. It should be noted that all functions of a device can be required to be authenticated or only a subset of functions can be designated. For example, a system administrator may designate using the camera function of the wireless device 104 as requiring authentication. Therefore, the wireless device 104 may only be associated with authentication modules 108 in areas of an office building where cameras can be used. Therefore, when the wireless device 104 enters an area where cameras are restricted, the device 104 is not authenticated (or associated) with the authentication modules 108 (if any) in that area.

It should be noted that the wireless device 104 can also comprise a plurality of keys 116. For example, a user may want to associate his/her wireless device 104 with various groups such as a work group, home group, friends group, or the like. In this example, a first key can be associated with authentication modules 108 at work. In a work environment all work users may share the same key(s). A second key can be associated with a home group where family members each share the second key. Therefore, the wireless devices 104 can be associated with various sets of authentication modules 108.

The present invention provides an advantageous system and method for updating and invalidating keys associated with wireless devices 104 and authentication modules 108. For example, the wireless communication system 100 can include one or more information processing systems 118 that include a key manager 120. The key manager 120 allows a business or an individual(s) to efficiently update keys in wireless devices 104 and their associated authentication modules 108. The information processing system 118 also includes a key database 122 comprising keys 124 currently managed by the key manager 120. The key database 122 can also comprise keys 126 that are awaiting association with a wireless device 104 and/or an authentication module 108. For example, keys can be updated manually via a system administrator through the key manager 120 or automatically by the key manager 120.

Manual updating can be accomplished by a system administrator creating a key and placing that key within the key manager 120. The key manager 120 can then communicate the new key to the wireless device 104 and/or authentication module 108. Alternatively, a system administrator can load a set of keys into the key manager 120 or the key manager 120 can be configured to automatically generate keys. In this example, the key manager 120 can replace/update keys at a wireless device 104 and/or authentication module 108 after a given time period without intervention by a system administrator.

The key manager 120 is communicatively coupled to a communication interface 128 for communicating with the wireless device 104 and/or the authentication module 108. The communication interface 128 can comprise any wireless technology for communicating with the wireless device 104 and the authentication module 108. For example, the key manager 120 can communicate with these devices 104, 108 either through the wireless communication network 102 or directly (i.e., not through the wireless communication network 102) with each device 104, 108. In one embodiment, the key manager 120 communicates with the authentication module 108 through the wireless device 104. In another embodiment, the key manager 120 communicates with the authentication module 108 directly. The communication standards discussed above with respect to the wireless communication network 102 are also applicable to communication interface 128.

In one embodiment, the wireless device 104 acts as a gateway for the key manager 120 to update key(s) residing at the authentication module 108. For example, when the key manager 120 determines that one or more keys at the wireless device and/or the authentication module 108 need to be deleted, updated, or the like, the key manager 120 communicates with the wireless device 104 and sends the updated key(s). The wireless device 104 then communicates with the authentication module and transmits the updated key to the authentication module 108. The communication interface 128 of the key manager 120 and the key manager interface 130 of the wireless device 104 allow each device to communicate with one another. The key manager 120 may determine that a key needs to be updated, deleted, added, etc. for various reasons. For example, a wireless device 104 may become compromised, e.g., stolen. A user or an administrator can notify the key manager 120 that one or more wireless devices 104 were stolen and therefore the key associated with that particular device needs to be erased or replaced with a null key.

In the current example, the wireless device 104 is not updated with a new key thereby making the wireless device non-functional or at least causing one or more functions to become deactivated. The user can acquire a new wireless device 104 that can be preprogrammed or updated with a new key via the key manager 120. The wireless device 104 processes the updated information from the key manager 120 and updates its current key via a key updater 132. The wireless device 104 then communicates with the authentication module 108 and transmits information associated with the key to the authentication module 108. The authentication module 108 subsequently updates its keys 116 via a key updater 138. Therefore, even though a user may have his/her wireless device 104 stolen or lost, the user can acquire a new device with a new key and update the existing authentication module(s) with the new key.

If the authentication module 108 is compromised along with a wireless device 104, the present invention still prevents any use of functions of the device 104. For example, because the key manager 120 erased the current key of the wireless device 104 via over-the-air programming, the wireless device 104 can no longer be authenticated even with the authentication module 108. Also, if the wireless device 104 is able to communicate with the authentication module 108, it may transmit the signal to the module 108 for erasing its key as well.

In many situations, as discussed above, a wireless device 104 is part of a group or fleet. Each wireless device 104 in a group can share the same key(s). Therefore, if one wireless device 104 is compromised, all of the wireless devices in the group become compromised since they share the same key(s). So the key manager 120 in addition to erasing out the key at the stolen or lost device updates the key(s) at each of the remaining wireless devices in the group. After processing the key update information, each of these devices then transmits the key update information to necessary authentication modules 108 as needed. It should be noted that, in one embodiment, the key manager 120 can communicate directly with the authentication module 108 instead of first communicating with the wireless device 102. It should also be noted that keys are not required to be updated only when a device is compromised. For example, the key manager 120 can automatically update keys at wireless devices 104 and authentication modules 108 after a cryptographic period has expired. A cryptographic period is a time interval associated with one or more keys that indicates how long a key or set of keys are valid.

One advantage of the present invention is that keys are managed by a key manager 120 that allows large numbers of devices to be easily updated with new keys. This is beneficial because keys no longer have to be manually entered into devices. For larger groups or fleets, manual entry of keys can be very cumbersome and very time consuming. This leads to cryptographic periods being set at very long intervals. The present invention, on the other hand, uses a key manager 120 that can automatically update keys if a device becomes compromised or after a cryptographic period has expired. Cryptographic periods can be set for much shorter periods (e.g., minutes, hours, days, weeks, etc.) than what current systems can efficiently handle.

Detailed Discussion of Authenticating a Wireless Device and Updating Cryptographic Keys The following is a more detailed discussion of the authentication and key updating processes discussed above. It should be noted that the following is only one example of how the present invention can be implemented and does not limit the invention in any way. As discussed above, the present invention uses authentication modules 108 for performing authentication such as proximity authentication against a wireless device 104. This ensures that a wireless device 104 is possessed by a valid user before allowing one or more operations. Authentication is performed between authorized wireless device/authentication module pairs that have been provisioned for authentication.

In one embodiment, the present invention uses a challenge/response type authentication for proximity authentication. In this embodiment, a secret symmetric key called the Proximity Authentication Key ("KP") is held in non-volatile memory in the authentication module 108 in order to authenticate the wireless device 104 for operation (which can include secure and/or non-secure functions). KP is initially provisioned to the authentication module 108 and the key manager 120 by a trusted technician. Once provisioned, the key manager 120 then has the ability to fully manage the keys 124, 126 of the authentication system. When the wireless device 104 authenticates with the authentication module 108, the wireless device 104 sends a challenge to the authentication module 108, and the authentication module 108 returns a response that requires knowledge of the KP. In the present embodiment, knowledge of the KP and the authentication algorithm are all that are needed to provide authentication services. As such, the system can be configured to allow multiple wireless devices 104 to be authenticated by multiple authentication modules 108 simply by providing the authentication modules 108 with the same KP.

Figure 2:
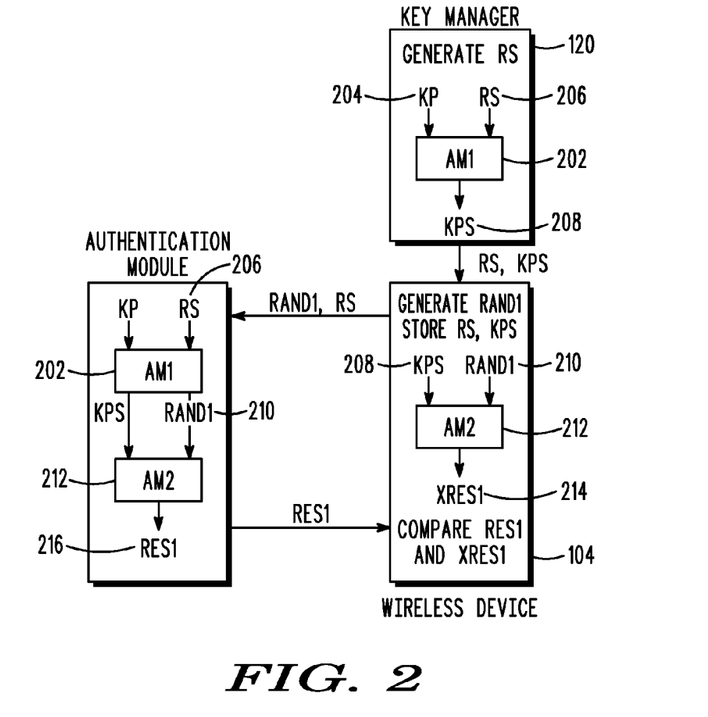
FIG. 2 is a transactional diagram illustrating a proximity authentication procedure for authenticating a wireless device according to an embodiment of the present invention.

Authentication is performed on a low power signal emitted by both authenticators 110, 134 in the wireless device 104 and the authentication module 108, respectively. An illustrative example of proximity authentication is shown in FIG. 2. The key manager 120 uses Authentication Mechanism 1 ("AM 1") 202, KP 204, and randomly generated seed, Random Seed ("RS") 206, to create the Proximity Authentication Session Key ("KPS") 208 for the wireless device 104. The key manager 120 passes RS 206 and KPS 208 to the wireless device 104 in order to enable the wireless device 104 to authenticate the authentication module 108.

The wireless device 104 generates Random Challenge 1 ("RAND 1") 210 and uses KPS 208 with Authentication Mechanism 2 ("AM2") 212 to create the Expected Response 1 ("XRES 1") 214 to authenticate the authentication module 108. The wireless device 104 passes RS 206 to the authentication module 108 so the authentication module 108 can create KPS 208 using AM1 202. The wireless device 104 also passes RAND 1 210 to the authentication module 108 so the authentication module 108 can create Response 1 ("RES 1") 216 using AM2 212. The authentication module 108 passes RES 1 216 to the wireless device 104 so the wireless device 104 can compare RES 1 216 to XRES 1 214. If RES 1 216 and XRES 1 214 match, the authentication is successful. Otherwise, the authentication has failed. It should be noted that several authentications may be performed by the wireless device 104 without having to contact the key manager 120. For example, the wireless device 104 could use the same RS 206 and KPS 208 and different RAND 1 210.

Each authentication module 108 has a programmable proximity identification number called a PID. The PID is to be present (encrypted) in any messaging exchanged between the wireless device 104 and the authentication module 108 as user identification. The PID prevents processing of unintended messages. All proximity authentication keys and PIDs in the system are modifiable by the key manager 120, thereby providing a practical method for obtaining acceptable KP crypto periods across the entire system made up of potentially thousands of users. Each authentication module 108 is initially provisioned with a Proximity Authentication Key Encryption Key ("PKEK"). The PKEK is used to wrap keys that are sent over-the-air destined for the authentication module 108. A set of Proximity Authentication Key Management Messages ("PKMMs") can be created to facilitate the authentication process or pre-existing messages can also be implemented. A Proximity Traffic Encryption Key (PTEK) is the key that is used for outer layer encryption of the PKMMs.

The PKMMs are inner layer encrypted on the PKEK, outer layer encrypted on the PTEK and encapsulated, in the present embodiment, within a wireless device 104-bound Astro Key Management Message ("AKMM"). The PKMM is placed in the data layer of the AKMM. When the wireless device 104 receives a PKMM, it sends it to a crypto graphic module ("CM") (not shown) for decryption. Upon successful validation, the PKMM is extracted and sent to the wireless device 104 host (not shown). The wireless device 104 host sends the PKMM to the authentication module 108 where the PKMM is outer layer decrypted on its PTEK and, if necessary, inner layer decrypted on its PKEK. The message is then serviced. If a response is to be sent, the authentication module 108 creates the response message, encrypts on its PTEK and sends the message to the wireless device 104. The wireless device host receives the message, sends the message to the CM for AKMM encapsulation and the encrypted AKMM is then sent back to the host for transmission back to the key manager 120. In the current embodiment, only two messages are used to implement proximity authentication key management. Additional messages can be created to offer additional services and features.

The first message used to implement proximity authentication key management is a P-Modify Key and Response message. This message is used to modify keys within the wireless device 104 (and the authentication module 108). This message is capable of modifying the PK, PTEK or PKEK. Once message processing is complete, a response is sent to the key management system 120 to indicate message processing status. The second message used to implement proximity authentication key management is a P-Hello message. This message is used to confirm a messaging path from the key manager 120 to the authentication module 108 and back.

Figure 3:
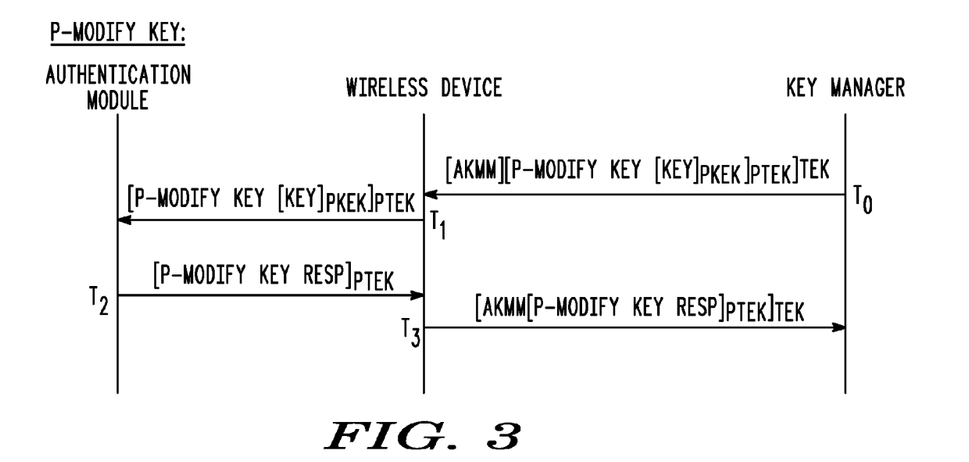
FIG. 3 is a transactional diagram illustrating messaging between a key manager, a wireless device, and an authentication module for updating keys according to an embodiment of the present invention.
Figure 4:
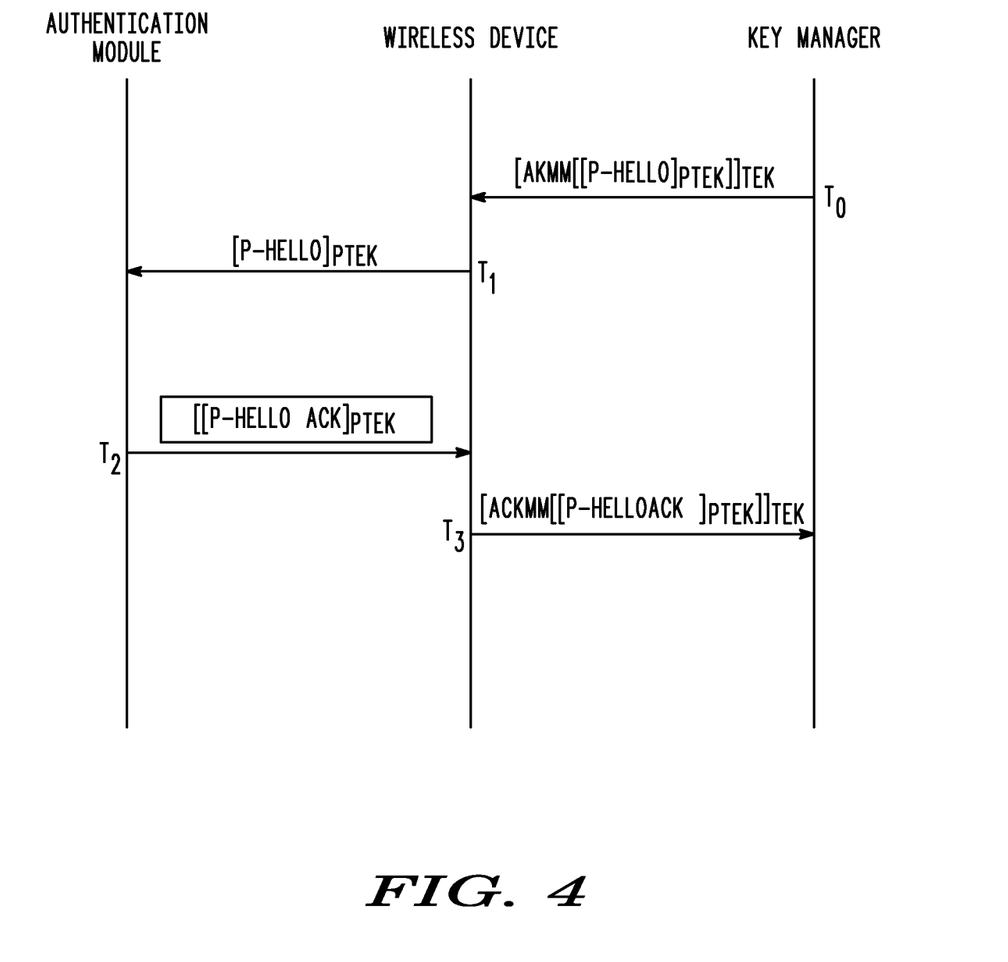
FIG. 4 is a transactional diagram illustrating confirmation of a messaging path from a key manager to an authentication module and back according to an embodiment of the present invention.

FIG. 3 and FIG. 4 are message sequence diagrams that show the messaging between the key manager 120, wireless device 104, and the authentication module 108, as well as the messages' encapsulations. In these diagrams, AKMM is the Astro KMM and the bracketed fields are encrypted on the subscripted key. With respect to FIG. 3, at time $T_0$, the key manager 120 sends a P-Modify Key message to the wireless device 104, which is inner layer encrypted on the PKEK, outer layer encrypted on the PTEK and encapsulated within an AKMM. The wireless device 104, at time $T_1$, decrypts the AKMM and upon successful validation, the P-Modify Key message is extracted and processed. After the wireless device 104 processes the P-Modify Key message it sends it to the authentication module 108. The authentication module, at time $T_2$, decrypts the P-modify Key message and performs whatever action is indicated by that message. The authentication module 108 generates a P-Modify Key Response message, encrypts the response on PTEK, and sends the response message back to the wireless device 104. The wireless device 104, at time $T_3$, places the P-Modify Key Response encrypted with PTEK in an AKMM encapsulation with TEK encryption. The P-Modify Response is then transmitted to the key manager 120.

With respect to FIG. 4, the key manager 120, at time $T_0$, sends a P-Hello message encrypted on the PTEK, encapsulated in an AKMM and encrypted on the TEK to the wireless device 104. The wireless device 104, at time $T_1$, receives the AKMM and decrypts it on the TEK and forwards the PTEK encrypted P-Hello message to the authentication module 108. The authentication module 108, at time $T_2$, generates a P-Hello Response (Ack) message, encrypts it on the PTEK and sends the PTEK encrypted P-Hello Response to the wireless device 104. The wireless device 104, at time $T_3$, encapsulates the PTEK encrypted P-Hello Response message in an AKMM and encrypts the AKMM on the TEK. The P-Hello Response message is then sent to the key manager 120.

Exemplary Wireless Device

Figure 5:
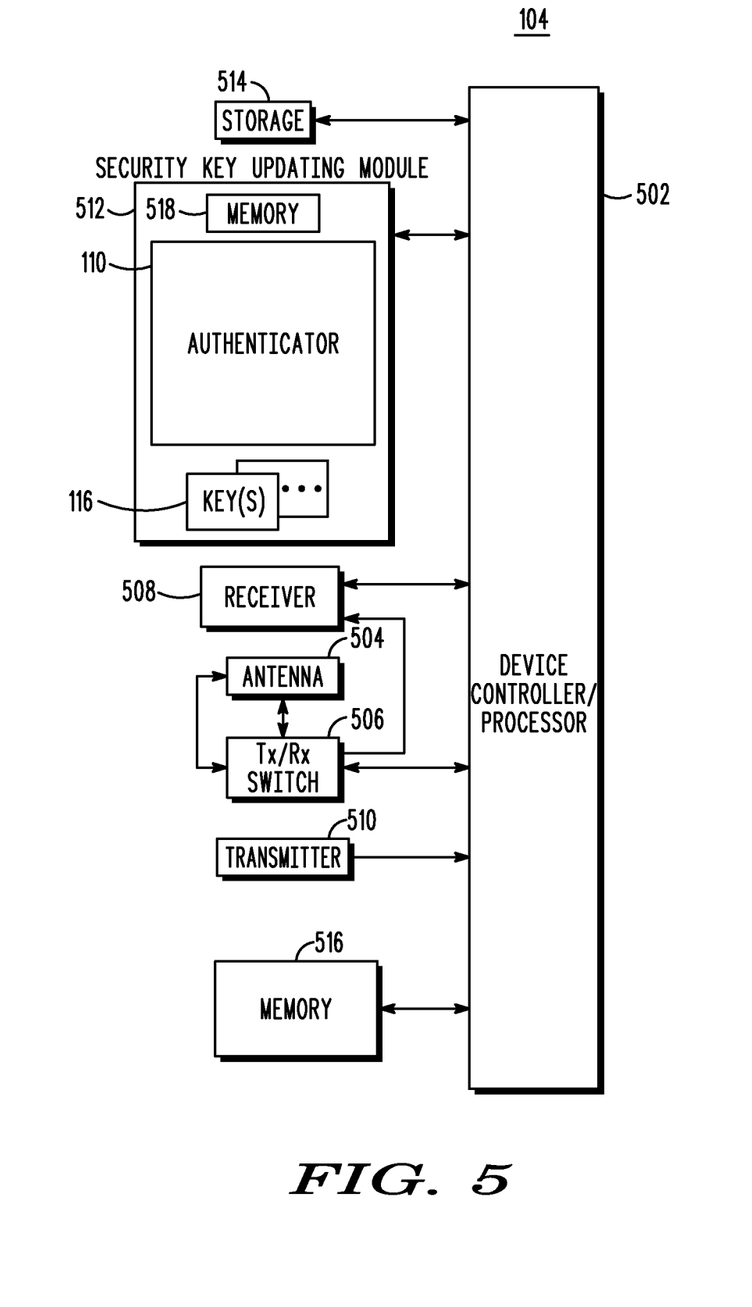
FIG. 5 is a block diagram illustrating a detailed view wireless device according to an embodiment of the present invention.

FIG. 5 is a block diagram illustrating a detailed view of the wireless device 104 according to an embodiment of the present invention. It is assumed that the reader is familiar with wireless communication devices. To simplify the present description, only that portion of a wireless communication device that is relevant to the present invention is discussed. It should be noted that the following discussion, where applicable, also applies to the authentication module 108 as well.

The wireless device 104 operates under the control of a device controller/processor 502, that controls the transmitting and receiving of wireless communication signals. In receive mode, the device controller 502 electrically couples an antenna 504 through a transmit/receive switch 506 to a receiver 508. The receiver 508 decodes the received signals and provides those decoded signals to the device controller 502.

In transmit mode, the device controller 502 electrically couples the antenna 504, through the transmit/receive switch 506, to a transmitter 510. It should be noted that in one embodiment, the receiver 508 and transmitter 510 are dual mode for receiving/transmitting over various access networks providing different air interface types. In another embodiment, a separate receiver and transmitter is used for each of type of air interface.

The device controller 502 operates the transmitter and receiver according to instructions stored in the memory 516. These instructions include, for example, a neighbor cell measurement-scheduling algorithm. The wireless device 104 also includes a security key updating module 512 for performing the cryptographic functions discussed throughout the above discussion. The security key updating module 512, in one embodiment, includes a memory 518, the authenticator 110 and one or more cryptographic keys 116, both of which have been discussed above. The wireless device 104, also includes non-volatile storage memory 514 for storing, for example, an application waiting to be executed (not shown) on the wireless device 104

Exemplary Information Processing System

Figure 6:
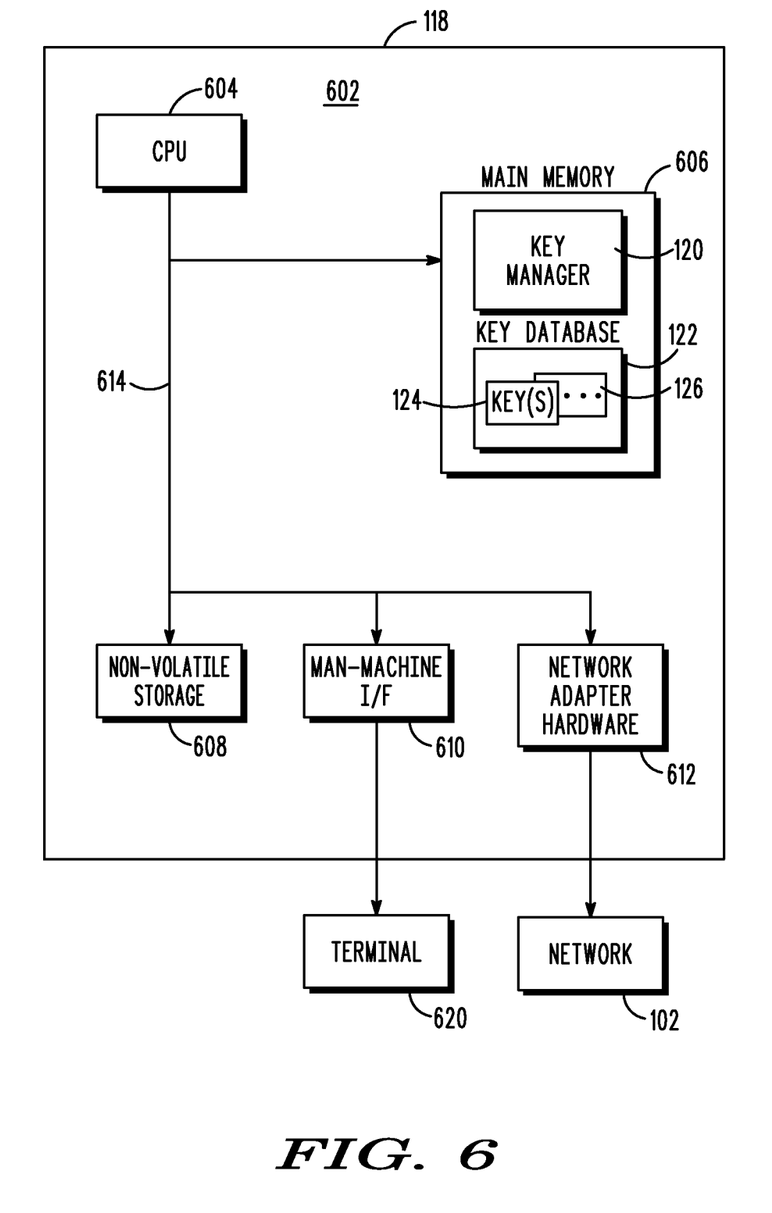
FIG. 6 is a block diagram illustrating a detailed view of an information processing system according to an embodiment of the present invention.

FIG. 6 is a block diagram illustrating a more detailed view of the information processing system 118. The information processing system 118 is based upon a suitably configured processing system adapted to implement the embodiment of the present invention. For example, a personal computer, workstation, or the like, may be used. The information processing system 118 includes a computer 602. The computer 602 has a processor 604 that is connected to a main memory 606, a non-volatile storage medium 608, a man-machine interface 610, and network adapter hardware 612, all of which are known to one of ordinary skill in the art. A system bus 614 interconnects these system components.

The main memory 606 includes the key manager 120 and one or more cryptographic keys 124, 126, both of which have been discussed above. The non-volatile storage 608 can be a storage medium such as a hard drive, flash memory, or the like. An operating system (not shown) included in the main memory is a suitable multitasking operating system such as Linux, UNIX, Windows XP, and Windows Server 2003. Embodiments of the present invention are able to use any other suitable operating system. A man-machine interface 610 allows technicians, administrators, and the like, to directly connect to the information processing system 600 via one or more terminals 620.

Process of Authenticating a Wireless Device

Figure 7:
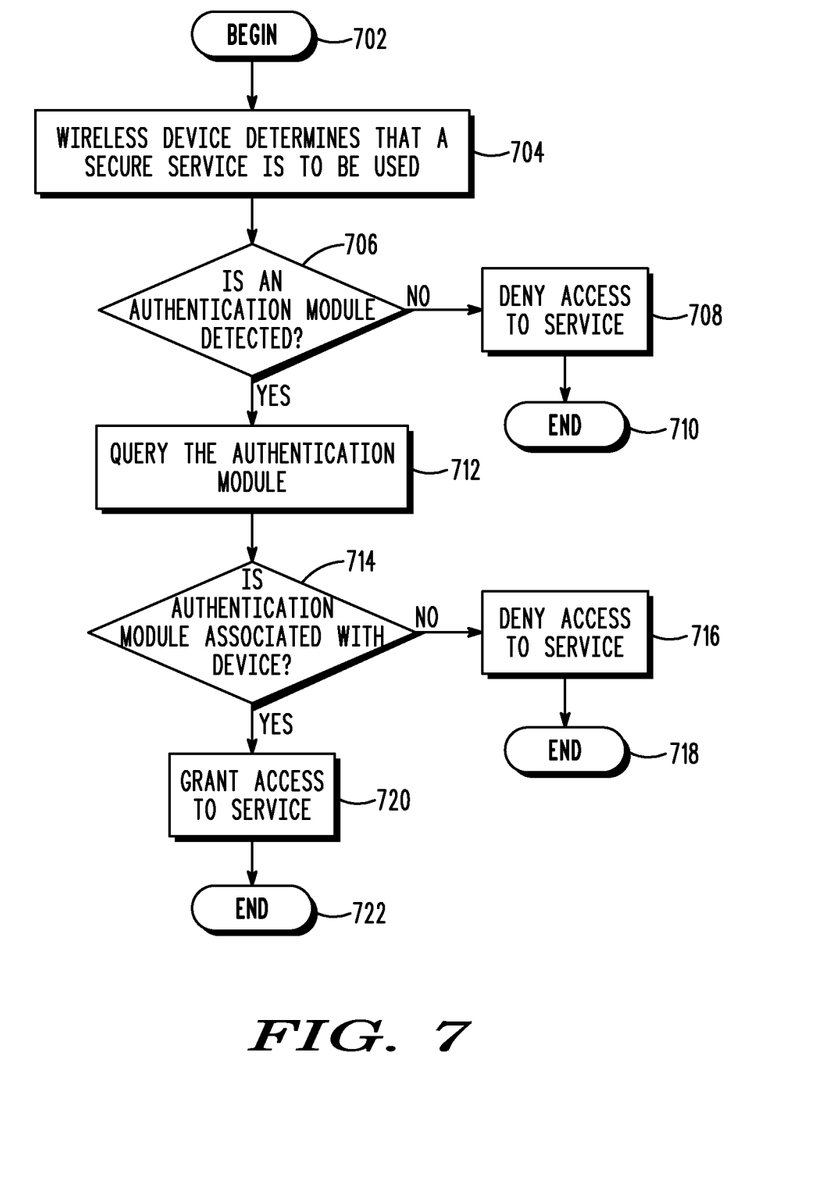
FIG. 7 is an operational flow diagram illustrating an authentication process between a wireless device and an authentication module according to an embodiment of the present invention.

FIG. 7 is an operational flow diagram illustrating an authentication process between a wireless device 104 and an authentication module 108. The operational flow diagram of FIG. 7 begins at step 702 and flows directly to step 704. At step 704, the wireless device 104 determines that a secure service is to be used. At step 706, the wireless device 104 determines whether an authentication module is detected. If the result of this determination is negative, access to the requested service is denied (step 708). The control flow then exits at step 710. If the result of the determination is positive, the wireless device 104 queries the authentication module 108 (step 712). For example, the wireless device 104 generates a challenge question and calculates an expected response. The wireless device 104 then transmits the challenge question to the authentication module 108.

At step 714, the wireless device 104 determines whether the authentication module 108 is associated with the wireless device 104. For example, the authentication module 108 generates a response to the challenge questions and transmits it over the air to the wireless device 104. The wireless device 104 compares the received response to its expected result. If there is a match, the authentication module includes the same key 116 as the wireless device 104. Thus, the wireless device 104 and authentication module 108 are associated. If the result of the determination at step 714 is negative, access to the requested service is denied (step 716). The control flow exits at step 718. If the result of the determination at step 714 is positive, access to the requested service is granted. The control flow then exits at step 722.

Figure 8:
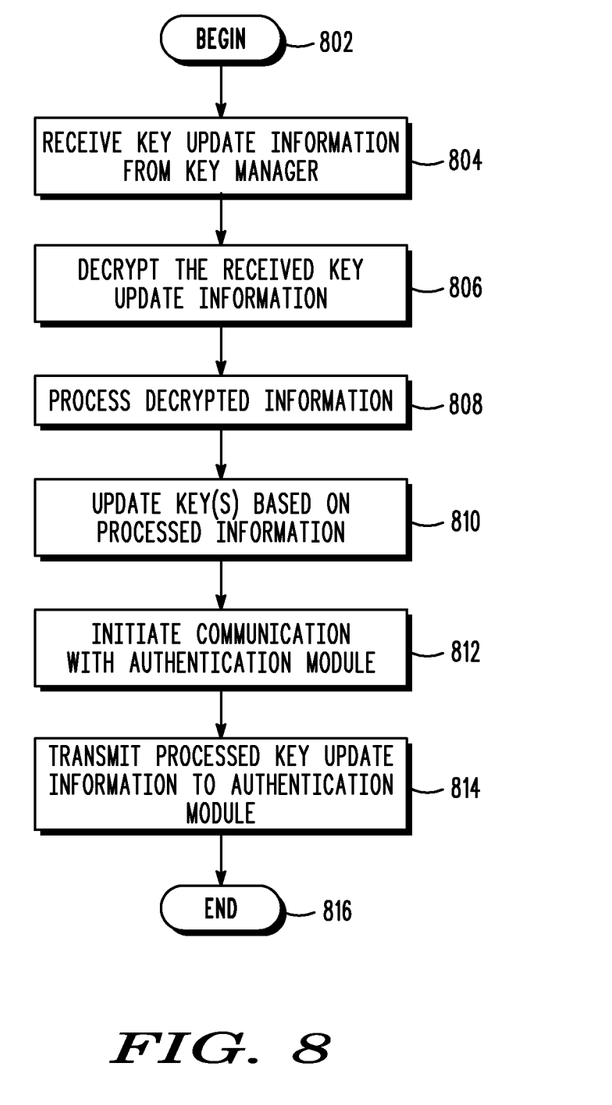
FIG. 8 is an operational flow diagram illustrating a process of updating cryptographic keys at a wireless device 104 and an authentication module according to an embodiment of the present invention.

Process of Updating a Cryptographic Key at a Wireless Device and its Associated Authentication Module FIG. 8 is an operational flow diagram illustrating a process of updating cryptographic keys at a wireless device 104 and an authentication module 108. The operational flow diagram of FIG. 8 begins at step 802 and flows directly to step 804. The wireless device 104, at step 804, receives key update information from a key management system 120. As discussed above, a key can be updated when the wireless device 104 has been compromised, when another device in the device's group has been compromised, when a cryptographic period has expired, and the like. In one embodiment, the key update information is received via over-the-air programming messages.

At step 806, the wireless device 104 decrypts the key update information. At step 808, the decrypted key update information is processed. At step 810, the wireless device 104 updates the key based on the processed key update information. In one embodiment, an existing key(s) 116 is updated with one or more new keys. In another embodiment, the existing key 116 is erased. Once the wireless device 104 processes the key update information, it initiates communication (step 812) with one or more associated authentication modules 108. At step 814, the wireless device 104 transmits the processed key update information to the authentication module(s) 108. Therefore, the authentication module 108 is also able to updates it key(s) 116. The control flow then exits at step 816.

Process of Updating a Cryptographic Key at an Authentication Module

Figure 9:
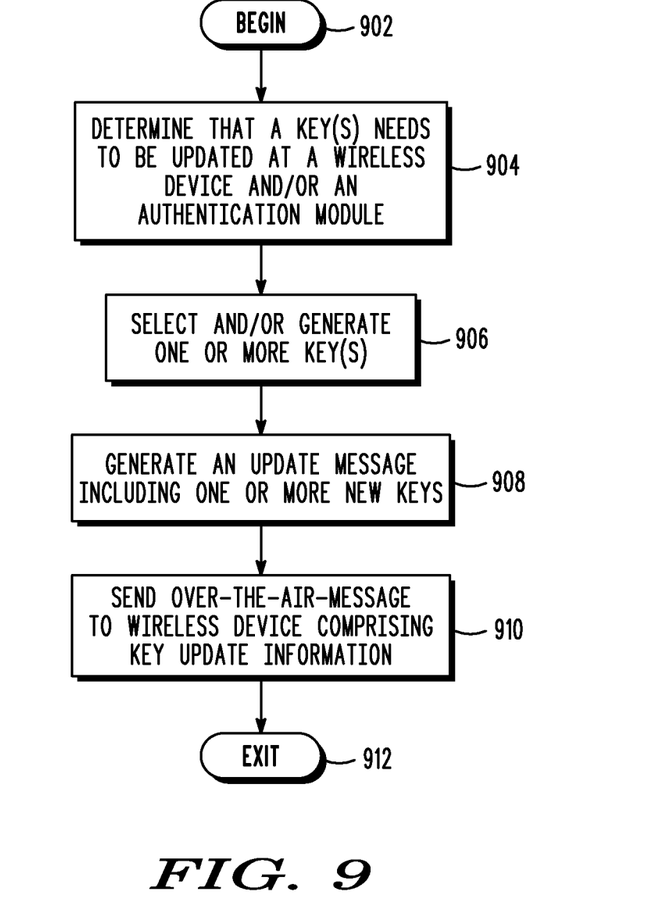
FIG. 9 is an operational flow diagram illustrating a process of a key manager 120 updating one or more keys at a wireless device 104 and/or an authentication module 108.

FIG. 9 is an operational flow diagram illustrating a process of a key manager 120 updating one or more keys at a wireless device 104 and/or an authentication module 108. The operational flow diagram of FIG. 9 begins at step 902 and flows directly to step 904. At step 904, the key manager 120 determines that one or more keys 116 at a wireless device 104 and/or an authentication module 108 need to be updated. At step 906, the key manager 120 either selects one or more keys 124 from its key database 122 or generates a new key 126. At step 908, the key manager 120 generates an update message including one or more new keys. Alternatively, if a key 116 at a wireless device 104 and an authentication module 108 need to be invalidated, the update message can comprise key invalidating information. At step 910, the key manager 120 sends an over-the-air message to the wireless device 104 to update the wireless device 104. The key manager 120 also uses the wireless device 104 as a gateway for communicating the update information to the authentication module 108. The control flow then exits at step 912.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. An authentication method for authenticating one or more functions at a wireless device based on a proximity of the wireless device to a corresponding authentication module, the method comprising:

the wireless device determining that a particular function has been requested;

the wireless device determining whether the particular function requires authentication of the wireless device via a wireless authentication module that is physically separate from the wireless device prior to execution of the requested particular function as a proxy for determining whether the wireless device is allowed to execute the particular function at the wireless device's current location;

responsive to the wireless device determining that the particular requested function requires authentication of the wireless device, the wireless device:

determining, via a short-range transceiver circuit of the wireless device, whether an authentication module is available within a short-range wireless communication range of the wireless device, and is thus proximate the wireless device, for use in authenticating the wireless device and thus determining whether the wireless device is allowed to execute the particular function at the wireless device's current location;

responsive to determining that a particular authentication module is within the short-range wireless communication range of the wireless device, the wireless device sending an authentication challenge to the authentication module and determining whether the wireless device is able to authenticate itself via the particular authentication module by comparing a locally produced authentication result and a remotely produced authentication result calculated at the authentication module responsive to the authentication challenge and transmitted back to the wireless device via the short-range transceiver circuit;

if the wireless device is not able to authenticate itself via the authentication module, by comparing and not finding a match between the locally produced authentication result and the remotely produced authentication result, the wireless device determining that it is not allowed to execute the particular function at the wireless device's current location and the wireless device refraining from executing the particular requested function;

if the wireless device is able to authenticate itself via the authentication module, by comparing and finding a match between the locally produced authentication result and the remotely produced authentication result, the wireless device determining that it is allowed to execute the particular function at the wireless device's current location and the wireless device executing the particular requested function.

2. The method of claim 1, wherein the wireless device contains a plurality of keys, each key being associated with a different authentication module, the determining whether the wireless device is able to authenticate itself via the particular authentication module comprising determining whether the wireless device and the particular authentication module share a common one of the plurality of keys.

3. The method of claim 1, further comprising responsive to determining that no authentication modules are within the short-range wireless communication range of the wireless device, the wireless device determining that it is not allowed to execute the particular function at the wireless device's current location and the wireless device refraining from executing the particular requested function.

4. The method of claim 1, further comprising affecting security of the wireless device and the authentication module by one of updating and adding a shared key to the wireless device and the authentication module, the shared key being received at the wireless device from a key manager device separate from the wireless device and the authentication module, and being transmitted to the authentication module via the wireless device.

5. The method of claim 1, further comprising affecting security of the wireless device and the authentication module by one of updating and adding a shared key to the wireless device and the authentication module, the shared key being separately transmitted to (i) the wireless device and (ii) to the particular authentication module without passing through the wireless device.

6. The method of claim 1, further comprising:

receiving, at the wireless device, a communication that the wireless device is to use the particular requested function, the particular requested function being a secure service.

7. The method of claim 1, further comprising:

receiving, over-the-air from a key manager device, a randomly generated seed and a proximity key created using the randomly generated seed, generating the authentication challenge by generating a random challenge and using the proximity key to create the expected response, sending the authentication challenge by forwarding the randomly generated seed as well as transmitting the random challenge, and the particular authentication module generating the remotely produced authentication result by:
generating an authentication key from the randomly generated seed, and
generating the remotely produced authentication result from the authentication key and the random challenge.

8. The method of claim 1, further comprising the wireless device determining that a second particular requested function does not require authentication of the wireless device via a wireless authentication module that is physically separate from the wireless device prior to execution of the second particular requested function, and the wireless device responsively executing the second particular requested function without authenticating itself via any authentication module.

9. The method of claim 1, wherein the wireless device is associated with a plurality of different authentication modules, each different authentication module controlling access to one or more corresponding different functions in the wireless device based on the wireless device's proximity to each corresponding different authentication module.

10. The method of claim 1, wherein a plurality of authentication modules are associated with a same set of functions at the wireless device, each authentication module in the plurality being associated with a different location and authenticating against different ones of the same set of functions so as to allow execution of different ones of the same set of functions at the different locations.

11. The method of claim 6, further comprising the wireless device performing an additional internal authentication process on the communication, in addition to determining whether the wireless device can authenticate itself via the particular authentication module.

12. The method of claim 1, further comprising affecting security of the wireless device and the authentication module by one of updating and adding a shared key to the wireless device and the particular authentication module, via the wireless device, if at least one of (i) another wireless device associated with the particular authentication module is compromised and (ii) a cryptographic period has expired.

13. The method of claim 1, wherein the short-range transceiver circuit comprises one of an RFID module, a Bluetooth module, a Zigbee module, and an infrared module.

14. The method of claim 1, wherein the particular requested function is one of (i) an encrypted transmission of voice, text, or multi-media, (ii) an encrypted reception of voice, text, or multi-media, and (iii) a display of sensitive data to a current user.

15. A wireless device adapted to authenticate one or more functions at the wireless device based on a proximity of the wireless device to a corresponding authentication module, the wireless device comprising:
    a memory;
    a processor communicatively coupled to the memory;
    a short-range transceiver; and
    a security key updating module communicatively coupled to the memory and the processor, wherein the security key updating module is adapted, responsive to detecting that a particular function has been requested and that the particular function requested requires authentication of the wireless device via a wireless authentication module that is physically separate from the wireless device prior to execution of the requested particular function as a proxy for determining whether the wireless device is allowed to execute the particular function at the wireless device's current location, to:
        determine, via the short-range transceiver, whether a particular authentication module is within a short-range wireless communication range of the wireless device, and is thus proximate the wireless device, for use in authenticating the wireless device and thus determining whether the wireless device is allowed to execute the particular function at the wireless device's current location;
        responsive to determining that a particular authentication module is within the short-range wireless communication range of the short-range transceiver, send an authentication challenge to the authentication module and determine whether the wireless device is able to authenticate itself via the particular authentication module by comparing a locally produced authentication result and a remotely produced authentication result calculated at the authentication module responsive to the authentication challenge and transmitted back to the wireless device via the short-range transceiver circuit;
        if the wireless device is not able to authenticate itself via the authentication module, by comparing and not finding a match between the locally produced authentication result and the remotely produced authentication result, cause the processor to determine that it is not allowed to execute the particular function at the wireless device's current location and to subsequently refrain from executing the particular requested function;
        if the wireless device is able to authenticate itself via the authentication module, by comparing and finding a match between the locally produced authentication result and the remotely produced authentication result, cause the processor to determine that it is allowed to execute the particular function at the wireless device's current location and to subsequently permit the processor to execute the particular requested function.

16. The wireless device of claim 15, wherein the wireless device contains a plurality of keys, each key being associated with a different authentication module, wherein the security key updating module is further adapted to determine whether the wireless device is able to authenticate itself via the particular authentication module by determining whether the wireless device and the particular authentication module share a common one of the plurality of keys.

17. The wireless device of claim 15, wherein the security key updating module is further adapted to, responsive to determining that no authentication modules are within the short-range wireless communication range of the wireless device, determine that it is not allowed to execute the particular function at the wireless device's current location and subsequently refrain from executing the particular requested function.

18. The wireless device of claim 15, wherein the wireless device is adapted to:
    receive, at the wireless device, a communication that the wireless device is to use the particular requested function, the particular requested function being a secure service.

19. The wireless device of claim 15, wherein the wireless device is adapted to:
    receive, from a key manager over-the-air, a randomly generated seed and a proximity key created using the randomly generated seed,
    generate the authentication challenge by generating a random challenge and using the proximity key to create the expected response, and
    send the authentication challenge by forwarding the randomly generated seed as well as the random challenge to the particular authentication module via the short-range transceiver.

20. A method for updating authentication information at a wireless device and a particular local authentication module for use in authenticating the wireless device via the particular local authentication module when the particular local authentication module is within a short-range wireless communication range of the wireless device as a proxy for determining whether the wireless device is allowed to execute a function at the wireless device's current location, the method comprising:
    receiving, at the wireless device, a key modification communication from a key manager device having multiple encryptions;
    decrypting an outer encryption of the key modification communication at the wireless device to produce an encrypted key modification message;

determining, via a short-range transceiver circuit of the wireless device, if a local authentication module is available that is associated with the wireless device and is available for use in authenticating the wireless device as a proxy for determining whether the wireless device is allowed to execute particular functions at the wireless device's current location;

responsive to determining that a particular local authentication module is available that is associated with the wireless device and is available for use in authenticating the wireless device, updating the particular local authentication module, the updating comprising:

transmitting the encrypted key modification message from the wireless device to the particular local authentication module via the short-range transceiver circuit of the wireless device;

decrypting an encryption of the key modification message at the particular local authentication module to produce decrypted key modification instructions to update or invalidate a key associated with the wireless device and the particular local authentication module;

encrypting a key modification response at the particular local authentication module;

transmitting the encrypted key modification response from the particular local authentication module to the wireless device;

further encrypting the encrypted key modification response at the wireless device; and     transmitting the further encrypted key modification response from the wireless device to the key manager device;

decrypting the encrypted key modification message at the wireless device to produce the decrypted key modification instructions to update or invalidate a key associated with the wireless device and the particular local authentication module;

servicing the decrypted key modification instructions at the particular local authentication module and at the wireless device; and if, as a result of the servicing, the particular local authentication module is no longer associated with the wireless device such that the wireless device cannot authenticate itself via the particular local authentication module as a proxy for determining whether the wireless device is allowed to execute particular functions at the wireless device's current location, disallowing at least one previously allowed function of the wireless device associated with the particular local authentication module.

* * * * *